US008145765B2

(12) United States Patent
Swildens et al.

(10) Patent No.: US 8,145,765 B2
(45) Date of Patent: *Mar. 27, 2012

(54) DISTRIBUTED ON-DEMAND COMPUTING SYSTEM

(75) Inventors: Eric Sven-Johan Swildens, Mountain View, CA (US); Richard David Day, Upton, MA (US); Vikas Garg, Madison, WI (US); Zaide Liu, Cupertino, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,351

(22) Filed: Sep. 11, 2009

(65) Prior Publication Data

US 2010/0005175 A1 Jan. 7, 2010

Related U.S. Application Data

(63) Continuation of application No. 11/089,982, filed on Mar. 24, 2005, now Pat. No. 7,590,739, which is a continuation-in-part of application No. 09/648,420, filed on Aug. 23, 2000, now Pat. No. 7,925,713.

(60) Provisional application No. 60/556,143, filed on Mar. 24, 2004, provisional application No. 60/166,906, filed on Nov. 22, 1999.

(51) Int. Cl.
*G06F 15/16* (2006.01)
*G06F 15/173* (2006.01)
*G06F 15/177* (2006.01)

(52) U.S. Cl. .................. 709/226; 370/252; 709/203

(58) Field of Classification Search .......... 709/217–227, 709/200–203; 370/252
See application file for complete search history.

(56) References Cited

U.S. PATENT DOCUMENTS

| 5,884,038 A | 3/1999 | Kapoor |
| 5,935,207 A | 8/1999 | Logue et al. |
| 6,070,191 A | 5/2000 | Narendran et al. |

(Continued)

FOREIGN PATENT DOCUMENTS

WO    WO 00/14938    3/2000

OTHER PUBLICATIONS

State Intellectual Property of the People's Republic of China "The First Office Action" mailed Aug. 28, 2009, Serial No. 200680014200. 6, Applicant: Akamai Technologies, Inc., 9 pages.

(Continued)

*Primary Examiner* — Haresh N Patel
(74) *Attorney, Agent, or Firm* — Joshua T. Matt

(57) ABSTRACT

A method and mechanism for a distributed on-demand computing system. The system automatically provisions distributed computing servers with customer application programs. The parameters of each customer application program are taken into account when a server is selected for hosting the program. The system monitors the status and performance of each distributed computing server. The system provisions additional servers when traffic levels exceed a predetermined level for a customer's application program and, as traffic demand decreases to a predetermined level, servers can be un-provisioned and returned back to a server pool for later provisioning. The system tries to fill up one server at a time with customer application programs before dispatching new requests to another server. The customer is charged a fee based on the usage of the distributed computing servers.

32 Claims, 7 Drawing Sheets

U.S. PATENT DOCUMENTS

| | | |
|---|---|---|
| 6,092,178 A | 7/2000 | Jindal et al. |
| 6,101,537 A | 8/2000 | Edelstein et al. |
| 6,108,703 A | 8/2000 | Leighton et al. |
| 6,115,752 A | 9/2000 | Chauhan |
| 6,119,153 A | 9/2000 | Dujari et al. |
| 6,122,666 A | 9/2000 | Beurket et al. |
| 6,128,279 A | 10/2000 | O'Neill et al. |
| 6,134,583 A | 10/2000 | Herriot |
| 6,134,588 A | 10/2000 | Guenthner et al. |
| 6,154,849 A | 11/2000 | Xia |
| 6,167,427 A | 12/2000 | Rabinovich et al. |
| 6,178,160 B1 | 1/2001 | Bolton et al. |
| 6,205,481 B1 | 3/2001 | Heddaya et al. |
| 6,260,070 B1 | 7/2001 | Shah |
| 6,282,569 B1 | 8/2001 | Wallis et al. |
| 6,304,913 B1 | 10/2001 | Rune |
| 6,351,775 B1 | 2/2002 | Yu |
| 6,351,776 B1 | 2/2002 | O'Brien et al. |
| 6,370,620 B1 | 4/2002 | Wu et al. |
| 6,374,297 B1 | 4/2002 | Wolf et al. |
| 6,381,627 B1 | 4/2002 | Kwan et al. |
| 6,393,458 B1 | 5/2002 | Gigliotti et al. |
| 6,405,252 B1 | 6/2002 | Gupta et al. |
| 6,415,335 B1 | 7/2002 | Lowery et al. |
| 6,427,170 B1 | 7/2002 | Sitaraman et al. |
| 6,427,187 B2 | 7/2002 | Malcolm |
| 6,438,652 B1 | 8/2002 | Jordan et al. |
| 6,487,555 B1 | 11/2002 | Bharat et al. |
| 6,526,580 B2 | 2/2003 | Shimomura et al. |
| 6,535,509 B2 | 3/2003 | Amicangioli |
| 6,542,964 B1 | 4/2003 | Scharber |
| 6,553,376 B1 | 4/2003 | Lewis et al. |
| 6,560,639 B1 | 5/2003 | Dan et al. |
| 6,560,717 B1 | 5/2003 | Scott et al. |
| 6,564,193 B1 | 5/2003 | Shore et al. |
| 6,578,066 B1 | 6/2003 | Logan et al. |
| 6,601,090 B1 | 7/2003 | Gurijala et al. |
| 6,606,643 B1 | 8/2003 | Emens et al. |
| 6,704,781 B1 | 3/2004 | Einarson et al. |
| 6,724,733 B1 | 4/2004 | Schuba et al. |
| 6,754,699 B2 | 6/2004 | Swildens et al. |
| 6,754,706 B1 | 6/2004 | Swildens et al. |
| 6,785,769 B1 | 8/2004 | Jacobs et al. |
| 6,795,434 B1 | 9/2004 | Kumar et al. |
| 7,454,500 B1 | 11/2008 | Hsu et al. |
| 7,590,739 B2 * | 9/2009 | Swildens et al. .............. 709/226 |
| 2001/0052015 A1 | 12/2001 | Lin et al. |
| 2001/0056416 A1* | 12/2001 | Garcia-Luna-Aceves ........ 707/2 |
| 2002/0052942 A1 | 5/2002 | Swildens et al. |
| 2003/0126202 A1* | 7/2003 | Watt .............................. 709/203 |
| 2005/0088976 A1* | 4/2005 | Chafle et al. ................... 370/252 |
| 2008/0147866 A1 | 6/2008 | Stolorz et al. |

OTHER PUBLICATIONS

Current claims for Chinese patent application, Serial No. 200680014200.6, 6 pages, Aug. 28, 2009.

Office Action From Chinese Patent Office for Application 20060014200.6 dated Jan. 18, 2011 (translation attached).

Office Action From Chinese Patent Office for Application 20060014200.6 dated Aug. 28, 2009 (translation attached).

International Searching Authority, "International Search Report", PCT/US06/10802, dated Jul. 17, 2008, 10 pages.

Claims, PCT/US06/10802, 6 pages, dated Jul. 17, 2008.

* cited by examiner

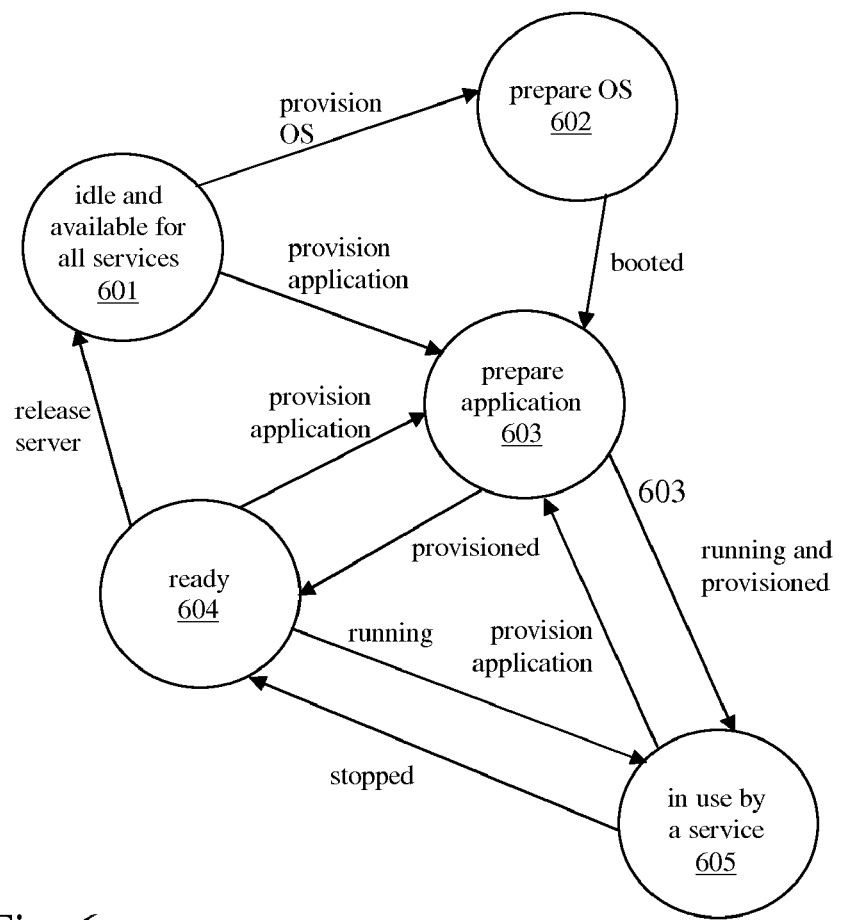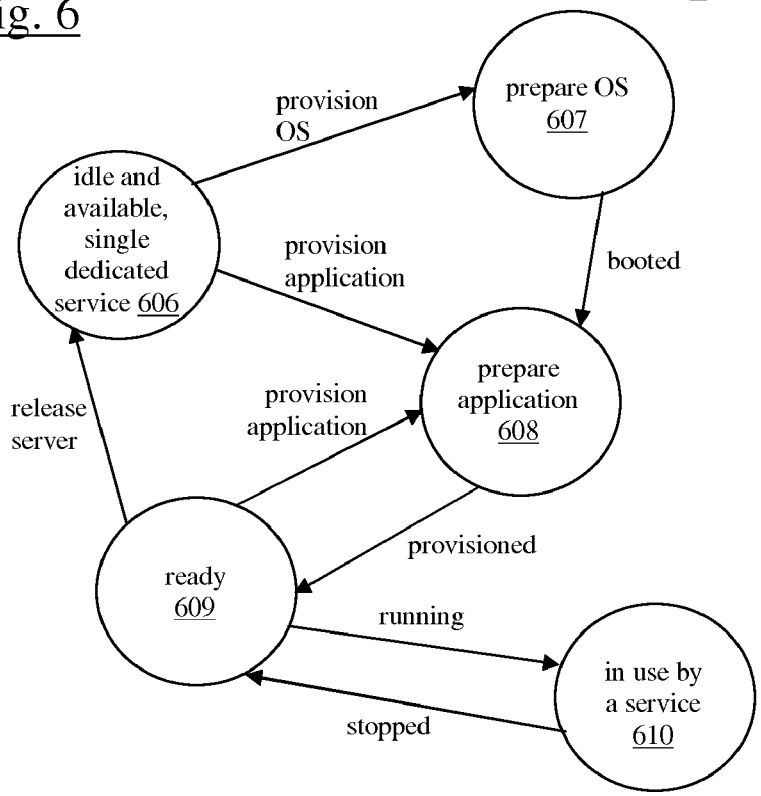
Fig. 6

DISTRIBUTED ON-DEMAND COMPUTING SYSTEM

CROSS-REFERENCE TO RELATED APPLICATIONS; BENEFIT CLAIM

This application is a continuation of U.S. application Ser. No. 11/089,982, filed Mar. 24, 2005 (now U.S. Pat. No. 7,590,739), which is a continuation-in-part of U.S. application Ser. No. 09/648,420, filed Aug. 23, 2000 (now U.S. Pat. No. 7,925,713), which claims benefit of priority to U.S. Prov. Appln. Ser. No. 60/166,906, filed Nov. 22, 1999, and said U.S. application Ser. No. 11/089,982 claims benefit of priority to U.S. Prov. Appln. Ser. No. 60/556,143, filed Mar. 24, 2004, the entire contents of each of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to distributing computing resources among a plurality of servers in a network.

BACKGROUND

The Internet has provided an immense number of opportunities for companies to offer services to the public. Each opportunity requires a server to perform services for a user. As companies grow their networks of servers to host their application programs, the costs of obtaining the servers and maintaining the servers rises dramatically.

A typical company is not set up to provide efficient Internet access to its servers. Those companies do not have the presence in the Internet to serve users in different geographical areas in a manner that provides consistent response times.

Further, demand for a company's services typically varies as time goes by. The biggest risk to a company is to invest in a large network of servers only to find that the demand for the application programs on those servers was not up to predictions. On the other hand, the popularity for a company's application program may far exceed the capacity of the company's servers leaving users staring at their computer monitors waiting for a response from the company's servers.

Content Delivery Network (CDN) service providers have servers distributed across the Internet. They have been providing "utility computing" in an "on-demand" manner for years. The CDNs are one of the first Internet-based examples of a computing service that is priced based on consumption and provisioned based on need. In a CDN, content is deployed to more servers as demand for the content grows and the content is removed from those servers as demand shrinks. Likewise, the price changes with the number of locations and the volume of content distributed. However, the CDN does not have the facilities to host a company's application programs.

What is desired is to be able to provide a system that has the Internet presence of a CDN in a network of servers combined with the ability to dynamically distribute a company's application programs to servers in the network. This would offer the flexibility needed for companies to distribute their application programs to servers across the Internet according to demand in an efficient manner. The companies would benefit by having fast user response times and low set up and maintenance costs.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 6 is a block diagram that illustrates Distributed On-Demand Computing server states according to an embodiment of the invention.

DETAILED DESCRIPTION

Figure 1:
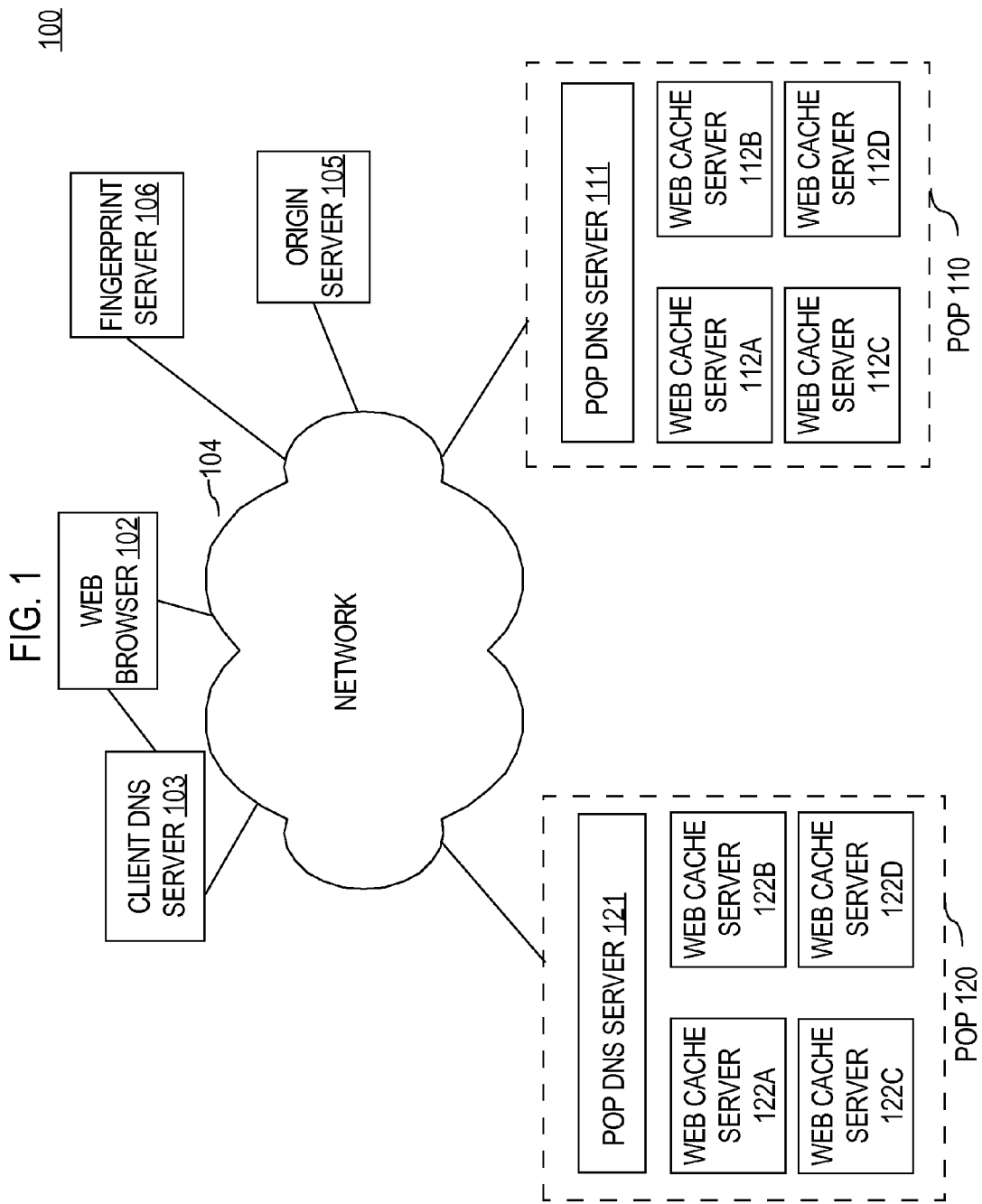
FIG. 1 is a block diagram illustrating a Content Delivery Network implementing an embodiment of the invention according to an embodiment of the invention.

In the following description, for the purposes of explanation, numerous specific details are set forth in order to provide a thorough understanding of the embodiments of invention described herein. It will be apparent, however, that embodiments of the invention may be practiced without these specific details. In other instances, well-known structures and devices are shown in block diagram form in order to avoid unnecessarily obscuring the description of embodiments of the invention.

Functional Overview

Techniques are discussed herein for a distributed on-demand computing system. Embodiments of the invention integrate the load-balancing and provisioning functions of a Content Delivery Network (CDN) with distributed computing functions. The servers in the CDN are separated into Web cache servers and distributed computing servers. The system can automatically adjust the number of Web cache servers and distributed computing servers according to demand for each type of server. The system load balances traffic to the Web cache servers and distributed computing servers.

The system automatically provisions distributed computing servers with customer application programs. The parameters of each customer application program are taken into account when a server is selected for hosting the program. Additionally, the load of each candidate server is taken into account. The system monitors the status and performance of each distributed computing server. The provisioning of servers can be increased to handle increasing traffic levels and demand for the customer's application program. The system provisions additional servers when traffic levels exceed a predetermined level. Also, as traffic demand decreases to a predetermined level, servers can be un-provisioned and returned back to a server pool for later provisioning.

The system tries to fill up one server at a time with customer application programs before dispatching new requests to another server. A server that has been provisioned with at least one other application program is provisioned with the customer application program. Once the server reaches a predetermined level of usage, the system selects another server for provisioning.

The system sends the server an image of the customer's application program. If a certain operating system is required, then an image of the required operating system is sent to the selected server. The customer's application program and the operating system may be combined into a common image and sent to the server. The selected server will boot itself into the new operating system before executing the customer application program.

The system can be implemented on a network that does not perform Web caching and is dedicated to the distributed computing functionality.

The customer is charged a fee based on the usage of the distributed computing servers.

Architecture Overview

An embodiment of the invention utilizes a multi-service environment where each server in a dedicated network of servers can be used for totally different purposes and functions from other servers in the dedicated network of servers, i.e. different application programs and/or operating systems. In order to best utilize the server and network resources, the system allows optimal sharing of resources for both distributed applications and distributed Web caching in the same pool of servers and networks. The system integrates the load-balancing and provisioning functions of a Content Delivery Network (CDN) with distributed computing functions.

FIG. 1 is a block diagram illustrating a system 100 that incorporates a CDN. An embodiment of the invention can be implemented in a CDN system as described in U.S. Pat. Nos. 6,405,252, 6,754,706, 6,484,143, 6,754,699, and 6,694,358, all owned by the Applicant and incorporated herein by reference. A plurality of Point of Presence sites (POPs) are distributed across the network 104. Here two POPs 110 and 120 are shown. The network 104 is typically the Internet, but can be any other large scale network such as an enterprise intranet.

Each POP 110, 120 contains a plurality of Web cache servers 112A-112D, 122A-122D. Operationally, a Web cache server caches cacheable CDN customer (also referred to as content provider) content such as images, video, documents, and static Web page content obtained from the customer's origin server 105 and serves the cached content to client systems 102. The origin server 105 serves dynamic content to the client system 105. The Web cache server can also operate as a mirror server, serving all of the content of an origin server 105.

When a client makes a request for Web content through its Web browser 102, the request is sent to the client's local DNS server 103 for resolution of the host name. For example, Web browser 102 may transmit a request to resolve the host name of "www.customer.com" to client DNS server 103. The client DNS server 103 sends a domain name resolution request to a customer DNS server. Since the customer DNS server is configured to delegate its domain to a POP DNS as the authoritative DNS, it tells the client DNS server 103 to contact the authoritative POP DNS IP address for resolution of the request. The client DNS server 103 then sends the request to the authoritative POP DNS server 111.

The authoritative POP DNS server 111 finds an appropriate Web cache server within the Web cache servers 112A-112D in the POP to serve the content to the client based on factors such as traffic load, latency, whether the server is more likely to have the content cached, etc. The authoritative POP DNS server 111 returns the IP address of the Web cache server (e.g., 112A) to the client DNS server 103. The client DNS server 103 sends the address to the client Web browser 102.

Once the client Web browser 102 receives the IP address of the Web cache server 112A, it sends a request for Web content to the Web cache server 112A. The Web cache server 112A receives the request and searches its cache for the requested content. If the requested content is found in the Web cache server's cache, the content is then sent to the client Web browser 102.

If the content is not found in the Web cache server's cache, then the Web cache server 112A can request the content from the origin server 105. Once the Web cache server 112A receives the content from the origin server 105, the content is saved in the Web cache server's local cache and is sent to the client Web browser 102.

Any of the Web cache servers 112A-112D can be allocated to perform a distributed computing function. A distributed on demand computing (DODC) system employs servers at the POPs to execute a customer's application programs. Programs that perform functions such as a Web server (Apache, Microsoft Internet Information Services (IIS), etc.), massive multiplayer online role-playing games (MMORPG), any server application that accepts requests and sends responses to the requests, etc., are examples of customer application programs that are suitable to be deployed in a DODC system.

A customer deploys its application programs across the CDN when traffic is known to vary for its application programs. The advantage that the customer gains from deploying its application programs across the DODC is that the customer does not have to purchase resources such as servers and support infrastructure to implement its application network.

The DODC automatically adjusts to the fluctuations in traffic for the customer's application. The DODC selects servers in the POPs using criteria such as load, availability, and geographic demand. The DODC can select a server and provision the server to the environment required to execute the customer's application program. The provisioning of servers can be increased to handle increasing traffic levels and demand for the customer's application program. Conversely, as traffic demand decreases, servers can be un-provisioned and returned back to a DODC server pool for later provisioning. This process is described below.

Additionally, servers can be shared by multiple customer application programs that require the same type of operating environment (e.g., processor type, operating system, memory configuration, etc.).

The POP DNS servers 111, 121 provision servers within their POPs with the customer application programs. Once the servers are provisioned, they execute autonomously, running the customer application programs tasked to the servers. The POP DNS servers 111, 121 keep track of the health and performance of all the Web cache and DODC servers within their POPs. The POP DNS servers 111, 121 also performs load balancing of traffic to the DODC servers as well as to the Web cache servers. The DODC servers are managed by several modules described in detail below.

Although a CDN is described throughout the text, the DODC may be implemented in a network that does not include Web cache servers and is dedicated to DODC servers.

DODC Infrastructure

An embodiment of the invention distributes customer application programs across a network of remote servers. Each server can handle one or more customer application programs. The system allows the DODC provider to execute customer application programs anywhere in the provider's network of computer systems distributed across the Internet. The parameters of each customer application program are taken into account when a server is selected for hosting the program. Additionally, the load of each candidate server is taken into account.

The execution of a customer application program may have certain requirements such as operating system environment, processor type, memory availability, etc. A candidate server is selected using these criteria as well as availability. If a certain operating system is required, then the image of the required operating system is obtained and sent to the selected server. The selected server will boot itself into the new operating system before executing the customer application program.

Figure 2:
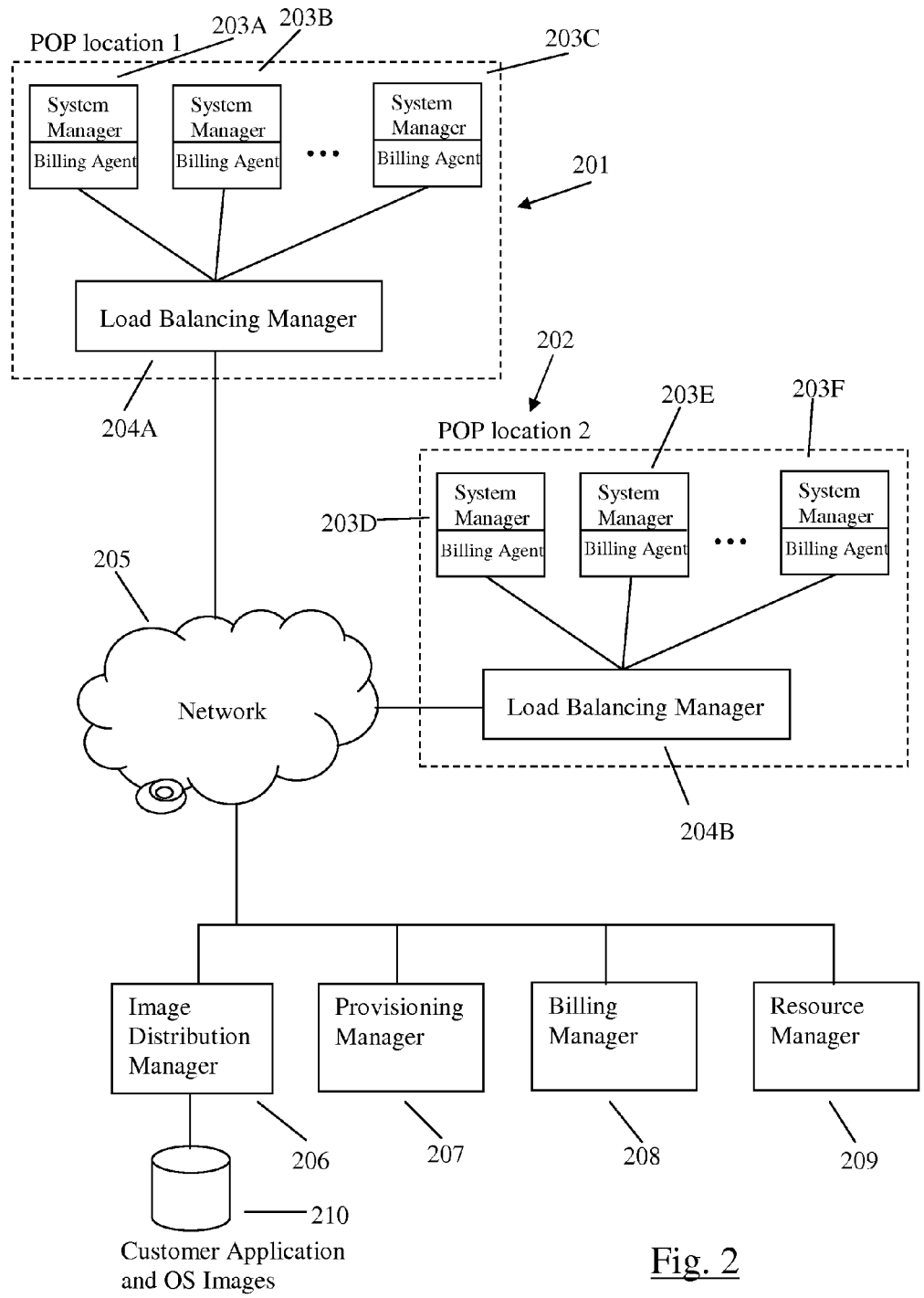
FIG. 2 is a block diagram illustrating a plurality of point of presence servers and distributed computing modules communicating across a network according to an embodiment of the invention.

Referring to FIG. 2, a plurality of POP locations 201, 202, are provided that have responsibility for distributed servers 203A-203F. The load balancing manager 204A-204B monitors each server's operating load, health, and failure within the load balancer's POP. The load balancing manager 204A-204B also manages the distribution of requests to servers 203A-203F. Within the DODC environment, the load balancing manager 204A-204B implements an algorithm that fills up one server 203A-203F at a time with customer application programs instead of evenly distributing the computing load to every server in the pool of servers. As noted above, a plurality of customers' application programs may share the resources of a common server. This results in a higher number of cache hits and a larger reserve of available servers 203A-203F.

Load balancers typically try to spread requests evenly across available servers that are capable of handling the requests. The algorithms employed to spread requests among servers include round-robin, weighted round-robin, connections based, or CPU utilization based, etc. These algorithms work well for servers that are dedicated for a single service such as an HTTP server or FTP server, but not for distributing computing functions among servers.

Instead of using the traditional evenly-spread method, the load balancing manager 204A-204B tries to fill up one server 203A-203F at a time with customer application programs before dispatching new requests to another server. In a typical configuration, the load balancing manager 204A-204B, for example, fills a server up to 70% of its processing and/or traffic capacity. If the processor utilization and/or traffic is steady at 70% or more for a specified amount of time, the load balancing manager 204A-204B starts to fill up another server. The policy parameters used for measuring the capacity of the servers are configurable by the system administrator and can vary for each server (e.g., to accommodate specific server limitations).

This approach has no performance impact at all compared with an evenly-spread load-balancing approach because the servers are not saturated to their full capacity. The approach has performance gains in many cases since the number of cache hits will be improved. Another other major benefit of this approach is that under light traffic, many servers will not get utilized at all. Those servers are not provisioned and are free to take on different functions within the network. Provisioning fresh servers for other purposes requires a graceful shut-down and wait time.

The load balancing manager 204A-204B feeds up to date information regarding the utilization of resources to the resource manager 209. The resource manager 209 knows which server is used and which server is idle.

The provisioning manager 207 decides when new machines must be added or released for certain applications and manages server 203A-203F provisioning. The provisioning manager 207 takes information received from the load-balancing manager 204A-204B and uses the information as well as policies derived from the customer service agreement of the customer whose application program is being distributed to make a provisioning decision.

An application can be classified by its characteristics:
  a. Communication model of the application: If the application must send and receive a large number of messages between it and the end users, it is more suitable for executing at a server on the edge of the Internet that is closer to the end users in a distributed manner. If the application must send and receive a large number of messages between it and the origin site, then it is more suitable for executing at a server in a location that is closer to the origin site.
  b. Computing model of the application: In general, the more computing intensive the application is, the more it is suitable for distributed computing environment. There is a balance between computing power needs and provisioning bandwidth needs. In an extreme example, it would be make no sense to take 30 seconds of provisioning to run one second of computing task.

The provisioning manager 207 performs provisioning either manually or automatically. Typically, a system administrator takes manual action based on some anticipated activity. Automatic provisioning is performed based on customer defined criteria. The provisioning manager 207 contacts the resource manager 209 to find idle servers and provisions only from those idle servers.

The provisioning manager 207 automatically determines which POP location and server is best for the specific customer application program. The optimal goal of the provisioning is to provide the best possible performance with minimal resources. The provisioning manager 207 factors some or all of the following parameters to select a server for provisioning:
  a. Application software availability from the server (already installed on the server or not).
  b. Resource (system, CPU, memory, disk space, etc.) availability from the server. Server resource availability is obtained from network probes as described in application Ser. No. 09/648,420.
  c. Provisioning expenses for the server (time needed for the application software installation and configuration, the bandwidth needed to transfer or to propagate the application software to the servers in the POP, etc.).
  d. Deployment expense for the server (time needed for the application software to warm up and to be ready to accept requests and the time needed for the application to cool down if the service from the server is not needed).
  e. Cache hit and miss predictions based on adding new POPs and servers.
  f. The network latency of the POP for the application client and the network latency of the POP for the application communication with other software applications such as database servers at the origin site.

The provisioning manager 207 also takes into account the customer's desire for additional computing capacity or higher availability, or both, when it makes the determination to add more servers.

The provisioning manager 207 adaptively weighs parameters with different weights for different application programs to:
  a. Decide whether a new server should be provisioned for additional computing demand.
  b. Select the optimal server and POP that can provide the additional computing power.
  c. Determine how many servers are needed for the additional computing demand.

The information above is calculated in real-time and the provisioning takes place in real-time. The provisioning manager 207 balances the need of high-availability, performance scalability, and provisioning for applications based on the following parameters:
  a. The provisioning expenses (the time needed for preparing a server and the application software).
  b. The equipment cost of adding additional servers (hardware, software, bandwidth, etc.).
  c. The application's longevity. Once the provisioning is deployed, it helps the stability of the system if the provisioned servers stay in deployment for a long period of time instead of having to deploy/un-deploy quickly to avoid a flip-flop situation which is time and resource consuming.

The billing manager 208 tracks the proliferation of a customer's application programs. A billing agent runs on each server 203A-203F to collect statistics regarding the utilization of the server's resources including CPU, disk, and bandwidth usage. CPU and bandwidth utilization are typically sampled at more frequent intervals to obtain an accurate measurement of the server performance and disk utilization is sampled less frequently because application programs are not as bursty in disk memory usage as with CPU and bandwidth usage. Server resource availability and utilization is obtained from network probes as described in application Ser. No. 09/648,420.

Figure 5:
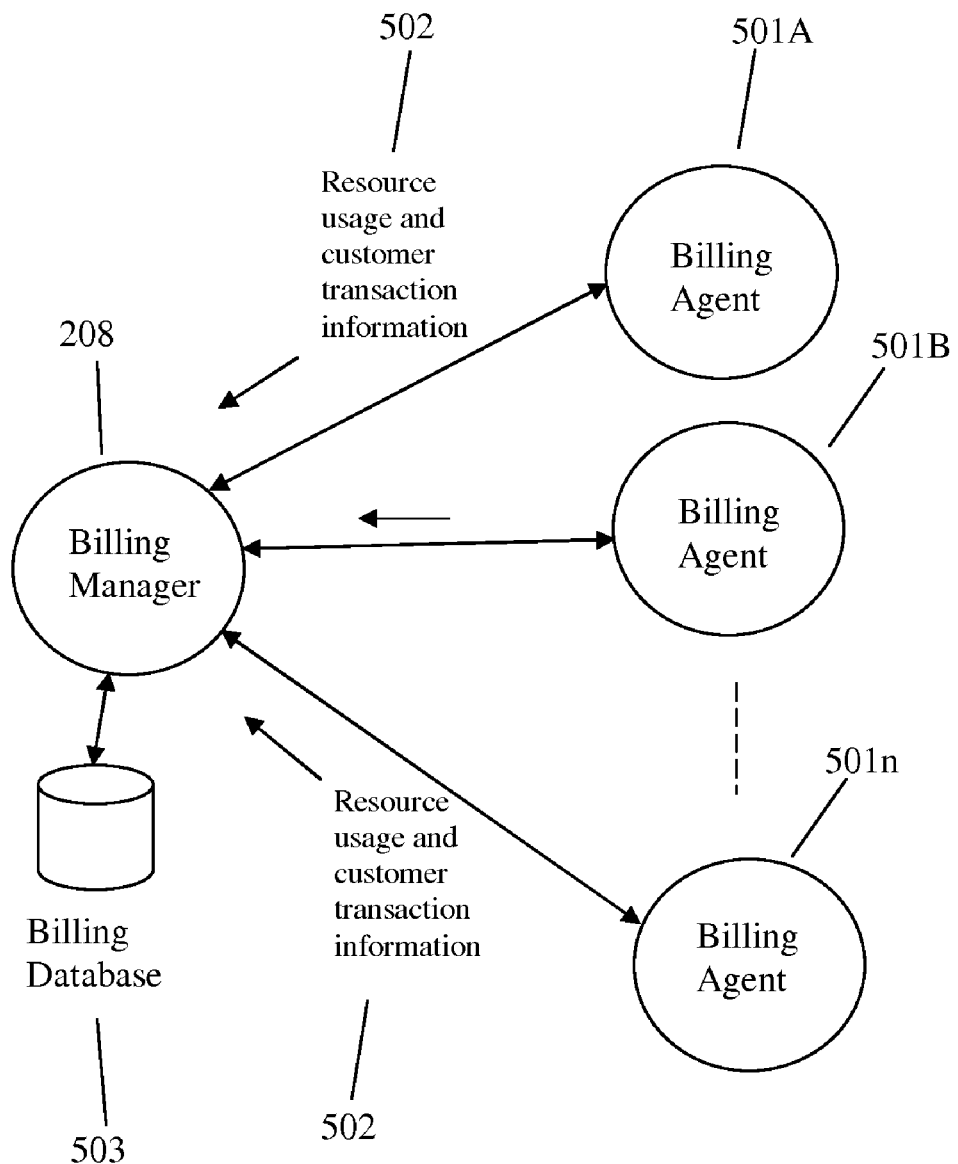
FIG. 5 is a block diagram illustrating interactions between a billing manager and billing agents according to an embodiment of the invention.

Billing is an important part for the distributed on demand computing (DODC) service. Customers need to know exactly what kind of computing service has been performed on their behalf. Especially when, where, and how much of the computing resources are deployed for what kind of services and what types of criteria are used with what kind of performance. Referring also to FIG. 5, the billing manager 208:
  1. Maps internal resource usage to external transactions that can be understood by customers. What a customer cares about is the number of transactions performed on its behalf using Web service-oriented computing. Additionally, customers care that the services are delivered in a timely manner and the performance is adequate for the end users. The billing manager 208 records both the internal usage of resources and the number of transactions performed for the customers. The billing manager 208 establishes a relationship between these two numbers that is used to establish a fee schedule. Customers can be billed by transactions and the customers know precisely how the system performed and what are bases of the billing.
  2. Collects transaction information of Web services 502 based on HTTP logs and customer application logs from billing agents 501A-501n on the DODC servers.
  3. The internal resource usage information is collected 502 from each DODC server deployed for the customer's service. This is achieved with a billing agent 501A-501n running on each server 203A-203F. The billing agent 501A-501n periodically samples some or all of the following information for each server:
    a. CPU utilization.
    b. Memory utilization.
    c. Disk utilization.
    d. IO activities.
    e. Network bandwidth utilization.
  4. Contacts each billing agent 501A-501n and collects the resource utilization in a central database 503.
  5. Takes the resource utilization of each server 203A-203F and calculates the total resource utilization based on a formula such as:

$$U = w1*cpu + w2*memory + w3*disk + w4*io + w5*bandwidth$$

The values of $w1$, $w2$, $w3$, $w4$, and $w5$ are weights. They are dependent on:
  a. The type of the server (operating system, etc.).
  b. The speed or capacity of the server.
  c. The price of the server.

In addition, the location of a server in the distributed environment is critical. The location is associated with cost of distribution and maintenance.

The reservation of provisioning servers is also weighted into the calculation even though these systems may not be used.

Distributing and propagating a customer application image takes CPU and bandwidth resources—this is factored in automatically in the billing information.

The resource manager 209 maintains an accurate picture of the states and status for all resources in the servers including the bandwidth, disk utilization, and CPU utilization. The states and status that the resource manager 209 maintains includes server 203A-203F health, load, and ownership (i.e., which load-balancing manager owns it for which customer). The load information comes from the load-balancing manager 204A-204B, the utilization comes from the billing manager 208, and the ownership information comes from provisioning manager 207.

A pool of servers in the CDN is created where the servers selected to participate in the DODC are determined by the administrator. The servers can co-exist with the CDN Web cache servers in the POPs. This allows the CDN provider to easily re-apportion the number of servers for the DODC and the number of Web cache servers in the CDN dynamically, depending on the demand for each type of server. Balancing the number of DODC servers and Web cache servers makes the most efficient use of the servers in the CDN.

The resource manager 209 keeps track of the servers 203A-203F and knows the exact state of each server. The servers 203A-203F can periodically send the server's status to the resource manager 209 to keep the resource manager 209 up to date. The resource manager 209 can also poll the servers 203A-203F for status reports or simply track the allocation of the servers 203A-203F. Referring to FIG. 6, a server in the DODC pool has at least the following states:
  1. Server is idle and available for all services 601.
  2. Server is idle and available, but it is reserved for a single dedicated service only 606.
  3. Server is in use by one of the services 605, 610.

A previously noted, the servers that are idle and available for all services can have additional customer application programs run on the server while the server is in use by one of the services to more efficiently utilize the server bandwidth. The server is initially placed in an idle state 601. If the server provisioning requires a new operating system, then the server is sent the operating system image and the application program image. The server transitions to the provision OS state 602 as it is instructed to provision the OS. Once the operating system is installed and booted, the server moves to the provision application program state 603. If the server already has the correct operating system installed, then the application program only needs to be provisioned and the server transitions from the idle state 601 to the provision application program state 603.

When the application program is installed and the server is provisioned, it moves to the ready state 604 and awaits activation. The server can be provisioned to run additional application programs and transitions from the ready state 604 back to the provision application program state 603 to provision another application program. From the ready state 604, the server is activated and instructed to run all of the application programs that it has been provisioned with and is then in use by a service 605.

While the server is in use 605, it can be further provisioned with additional application programs. The server transitions to the provision application program state 603 to install any additional application programs. Once it has been provisioned, it returns to the in use state 605, running all of the application programs. From the in use state 605, the server can be taken offline and stopped to be sent back to the ready state 604. From the ready state 605, the server can be re-provisioned and sent back to the provision application program state 603 or released back into the idle state 601.

In the case of a server that is reserved for a single dedicated service, the server is initially placed in an idle state 606. If the server provisioning requires a new operating system, then the server is sent the operating system image and the application program image. The server transitions to the provision OS state 607 as it is instructed to provision the OS. Once the operating system is installed and booted, the server moves to the provision application program state 608. If the server already has the correct operating system installed, then the application program only needs to be provisioned and the server transitions from the idle state 606 to the provision application program state 608.

When the application program is installed and the server is provisioned, it moves to the ready state 609 and awaits activation. From the ready state 609, the server is activated and instructed to run the application program that it has been provisioned with and is then in use by a service 610. From the in use state 610, the server can be taken offline and stopped to be sent back to the ready state 609. From the ready state 610, the server can be re-provisioned and sent back to the provision application program state 608 or released back into the idle state 606. If it is sent back to the provision application program state 608, the server is provisioned with a new application program and transitions back to the ready state 610. From the ready state 609, the server transitions back to the in use state 610 and run the application program.

The servers 203A-230F are managed by the load balancing manager 204A-204B for load-distribution of traffic after the server is in use by a service. The server becomes active and is placed in the load balancing manager's active server list.

The image distribution manager 206 manages the distribution of the customer application images and operating system images, which can be stored in a repository 210, to the provisioned servers. It manages the versions and patches for rollbacks and updates of the software. The image information itself contains installation scripts, booting sequences, and configuration customization instructions. The image distribution manager 206 tracks the software that each provisioned server is running. It has the ability to update specific servers as configured by the administrator. The administrator can set up certain updates to be downloaded to certain servers running a specific set of software. For example, it may not be feasible to update certain servers running a version of the software and are not using the features of an update.

System managers are in each server 203A-203F. They manage application imaging installation, operating system image installation, configuration customization, booting, and application startup.

All of the managers (load balancing manager 204, provisioning manager 207, billing manager 108, resource manager 109, image distribution manager 206, and system managers) interact with each other over the local network or Internet to ensure the streamlined service for DODC. The following is a typical provisioning sequence for provisioning a server 203A for a particular customer application:

1. Provisioning manager 207 interacts with load-balancing manager 204 to decide if the application load has reached a certain customer service agreement threshold level and to decide if it is time to add a new server for this particular application.
2. Provisioning manager 207 consults with resource manager 209 to obtain the best suitable resource. The resource could be a server 203A that was previously used for the same service with the application image already at the server 203A.
3. If the application image is not on the server 203A, then the provisioning manager 207 makes a request to the image distribution manager 206 to distribute the application image to the selected server 203A.
4. The system manager on the server 203A receives the application image from the image distribution manager 206, the system manager performs the necessary installation and configuration customization to the server 203A from the self-contained image packaging information. If the application requires a different version of OS, the system manager installs the OS and reboots the server with the new OS. The OS can be bundled together with the application image in the imaging. The system manager starts up the application on the server 203A.
5. The provisioning manager 207 adds the server 203A into the load-balancing pool and hands the server 203A to the responsible load balancing manager 204A for managing the computing distribution. The load balancing manager 204A updates the resource manager 209 with live information regarding the server's states if anything significant changes (e.g., the system going down).
6. While the server 203A is running with the application, the billing agent on the server 203A periodically performs a sampling (e.g., via network probes or direct inquiry) of the utilization of resources and periodically reports the results back to the billing manager 208.

Any combination of the managers, the load balancing manager 204, provisioning manager 207, billing manager 208, resource manager 209, image distribution manager 206, and system manager may be co-located on a common server, as well as the billing agent.

Figure 3:
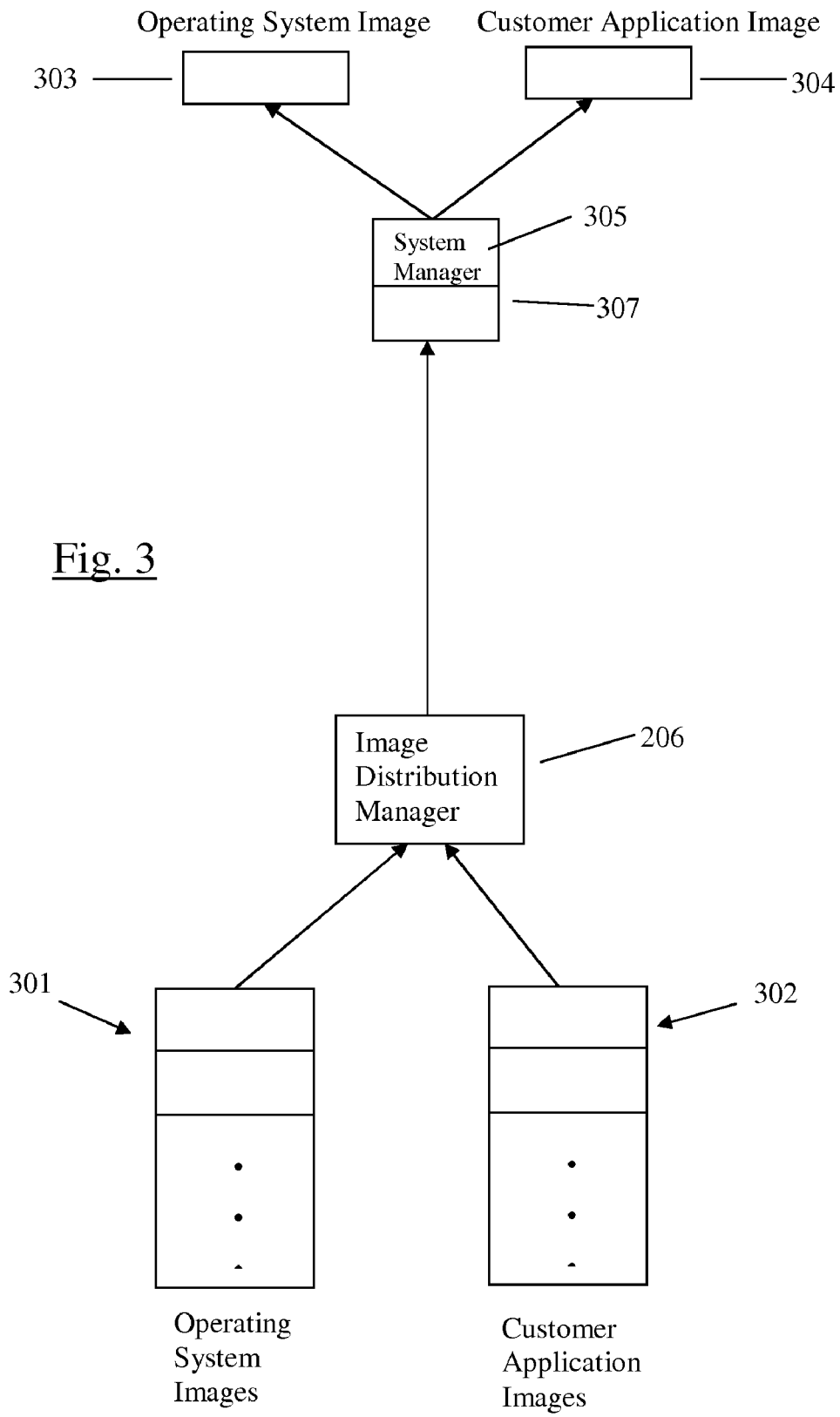
FIG. 3 is a block diagram illustrating an image distribution manager distributing program images to a server according to an embodiment of the invention.

Referring to FIG. 3, the image distribution manager 206 can select the appropriate operating system from a library of operating systems 301 for the customer application image selected from the set of customer application images 302. The appropriate customer application and operating system are then packaged together and sent to the destination server 307. The resulting image may be encrypted in some manner to ensure the security of the customer's application program. The resulting image may also have a checksum or other means to ensure that the delivered image is complete and not corrupted. The system manager 305 on the destination server 307 un-packages the operating system image 303 (if sent) and the customer application image 304. If an operating system image 303 is sent, then the system manager 305 installs the operating system image 305 on the server 307 and boots the server 307 into the operating system. The system manager 305 installs the customer application program image 304 on the server 307 and executes the application.

Efficient provisioning is very difficult without an effective mechanism for de-fragmentation. In the DODC environment, when Internet traffic spikes for a certain customer, the provisioning manager 207 kicks in and adds more systems for service. After some time, the traffic for the customer may start to fade. Just like in a disk fragmentation case, many systems are engaged for use by various customers. Most of the systems are running with very low resource utilization. Because of this, very few freshly available systems are left for the provisioning of new traffic requirements. This scenario is called provisioning fragmentation. Therefore, it is equally important to have a good de-fragmentation mechanism so more systems are readily available for provisioning.

As traffic requests go up, the provisioning manager 207 adds servers from the resource pool, and hands the servers off to the load-balancing manager 204A-204B to dispatch traffic requests for the customer. As described above, the load balancing manager 204 tries to fill up one server at a time. The load balancing manager 204 monitors the utilization of each server. When traffic requests start to slow down, the load balancing manager 204 uses the same fill-up policy to dispatch traffic. As traffic requests slow down further, one of the servers in the load balancing pool will eventually end up with no new requests. Eventually, all of the server's existing requests will be consumed and served. The load balancing manager 204 then returns that server back to the provisioning manager 207.

The provisioning manager 207 can then decide whether to keep the returned server back in the provisioning pool for a while or totally return it back to the resource manager 209 for other provisioning purposes. This depends on the provisioning prediction for the customer service patterns.

The mechanism described above efficiently de-fragments the servers without interrupting any on-going services. This mechanism is called graceful de-fragmentation since there is no interruption to the existing on-going traffic requests.

Some user sessions could last for hours, days or weeks. An example of this is an inactive chat connection. The load balancing manager 204 in that case must set a timeout period for the sessions and decide to abort the session in order to de-fragment the system. This scenario is called an ungraceful de-fragmentation since it interrupts existing on-going traffic requests. Both methods of de-fragmentation can be used and are an option based on a customer's particular requirements.

RFID in a CDN and DODC Environment

Radio Frequency Identification (RFID) is growing very popular for many applications. Units with RFID tags, such as ID cards and merchandise anti-theft tags, are detected by RFID transmitters/receivers. The RFID transmitters/receivers receive a limited amount of information from the RFID tag in the units that can include simple one bit information to full identification information. RFID has been mainly used for tracking, identification, and security purposes. Due to recent global security problems there has been an increasing demand for security applications such as homeland security, employee identification, and the access of vehicles to buildings, gated communities, corporate campuses and airports.

It is estimated that the major growth in the field will come from real-time location systems, asset management, baggage handling, and cash-less payment systems. Business segments such as supply chain management, logistics, warehousing and manufacturing greatly benefit from the use of RFID technology.

The amount of third party applications is expanding at a fast pace with the emphasis on large area applications. Database companies have offered database applications that are used by companies to track their inventories internally and at a local level. Companies such as Verisign and Global EPC are working on an object name server (ONS) architecture to allow RFID devices to interact across the Internet with servers. An embodiment of the invention provides an infrastructure for implementing RFID on a global network. The architecture of an embodiment's RFID life cycle management consists of the following components:

i. Distributed ONS information and caching servers (CDN for RFID IS).
   ii. Global traffic load-balancing managers for ONS name resolution (GTM for RFID).
   iii. RFID registration and management.
   iv. RFID life cycle management for ownership transfer and tracking.
   v. RFID information search engine.
   vi. Distributed on demand computing environment for RFID (DODC for RFID).

The integrated suite of components not only provides a powerful solution for RFID life cycle management, but also guarantees the fastest delivery of RFID content to surfers and high availability of RFID content in case of a disaster.

Figure 7:
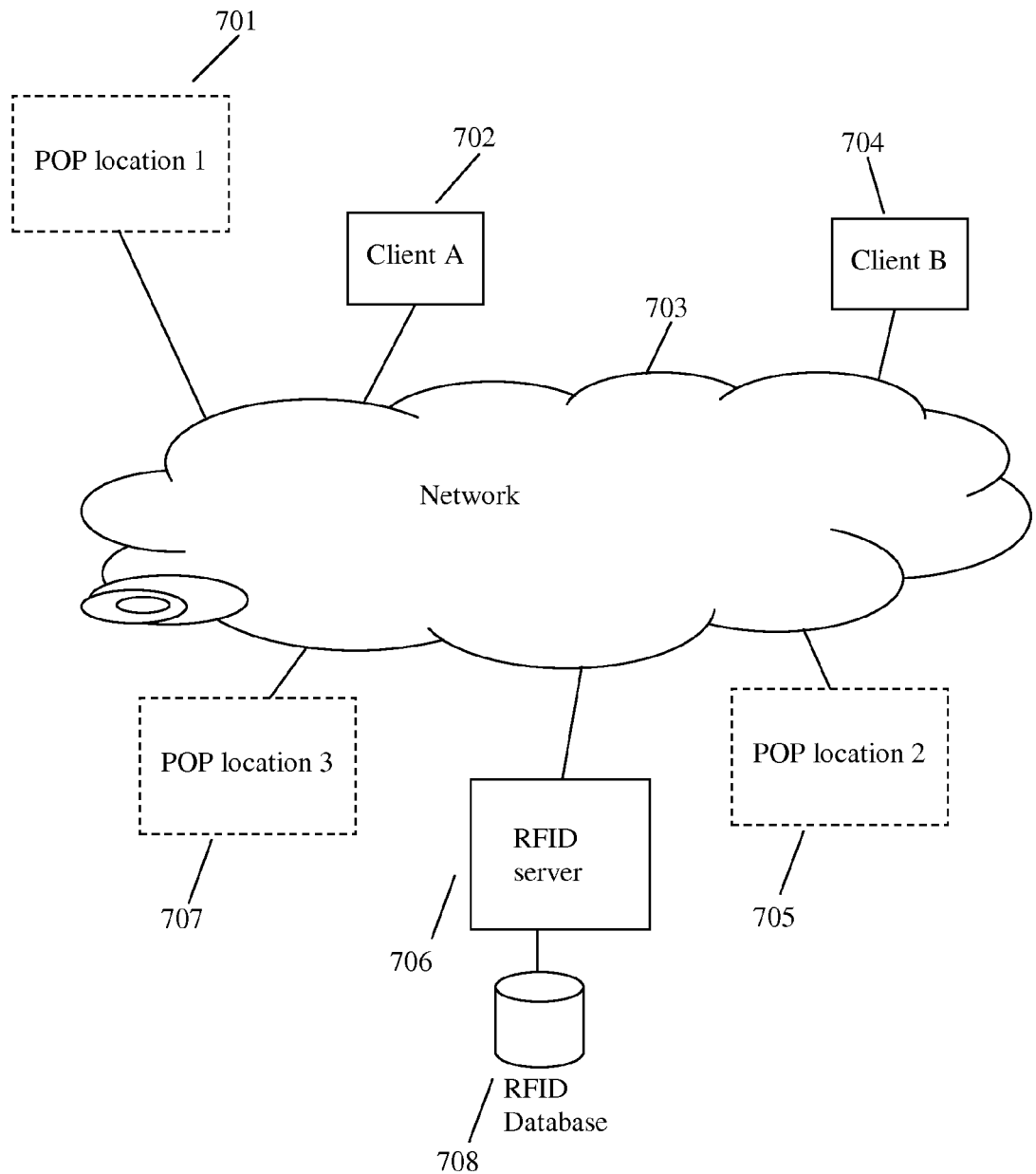
FIG. 7 is a block diagram that illustrates an embodiment of the invention hosting a Radio Frequency Identification (RFID) architecture in a Content Delivery Network with Distributed On-Demand Computing servers running RFID applications according to an embodiment of the invention.

Referring to FIG. 7, an embodiment of the invention provides distributed hosting service of ONS information servers for manufacturers and corporations. The system utilizes hundreds of hosting servers in POPs 701, 705, 707, worldwide across the Internet or large scale network 703 and provides distributed caching of the ONS information content worldwide using its caching technology. The system provides multiple copies of RFID information across the network in POPs 701, 705, 707, and guarantees high availability of RFID information content even if a few locations become inaccessible due to disasters or other reasons.

ONS requests are predicted to be ten times more frequent than DNS requests. Based on the GTM for DNS described above and as described in application Ser. No. 09/648,420, which is incorporated herein by reference, the system takes the same approach to load-balancing ONS requests. GTM for ONS monitors the health and load of ONS information servers at each POP location 701, 705, 707, worldwide and directs user requests to the server with the closest network proximity and with least load. For example, client A 702 would be directed to POP location 1 701 and client B 704 would be directed to POP location 2 705, in a typical situation.

RFID registration and management can provide an XML based interface and forms via RFID server 706. Manufacturers register their RFID and products into the RFID database 708. The interface includes authentication of the registers, verification of RFID ownership (interfacing to global EPC RFID number assignment), and detailed information about the products with the RFID. The interface provides both forms for manual input and APIs for automated RFID scanning input.

A life cycle manager on RFID server 706 takes care of RFID ownership transfer, and tracks the product history. When an ownership is transferred, the new owner makes a request to the life cycle manager on RFID server 706 for ownership transfer, which triggers an email to the old owner requesting release of ownership. The confirmation from the old owner will complete the ownership transfer. The life cycle manager on RFID server 706 maintains in the RFID database

708 all of the history for the product. This information can be used for product fraud verification, most likely with the owner's permission.

A search engine on RFID server 706 enables searching of the RFID database 708 for RFIDs, product names, categories, manufacturers, owners, prices, regions, searches on comparable products, etc.

DODC provides computing environments and resources for RFID applications (e.g., RFID supply-chain middleware) on demand. DODC for RFID allows RFID applications to run at locations close to the end users. DODC dynamically provisions and runs applications capable of handling unexpectedly heavy traffic without over the provisioning of servers at the front end.

Implementing Mechanisms

Figure 4:
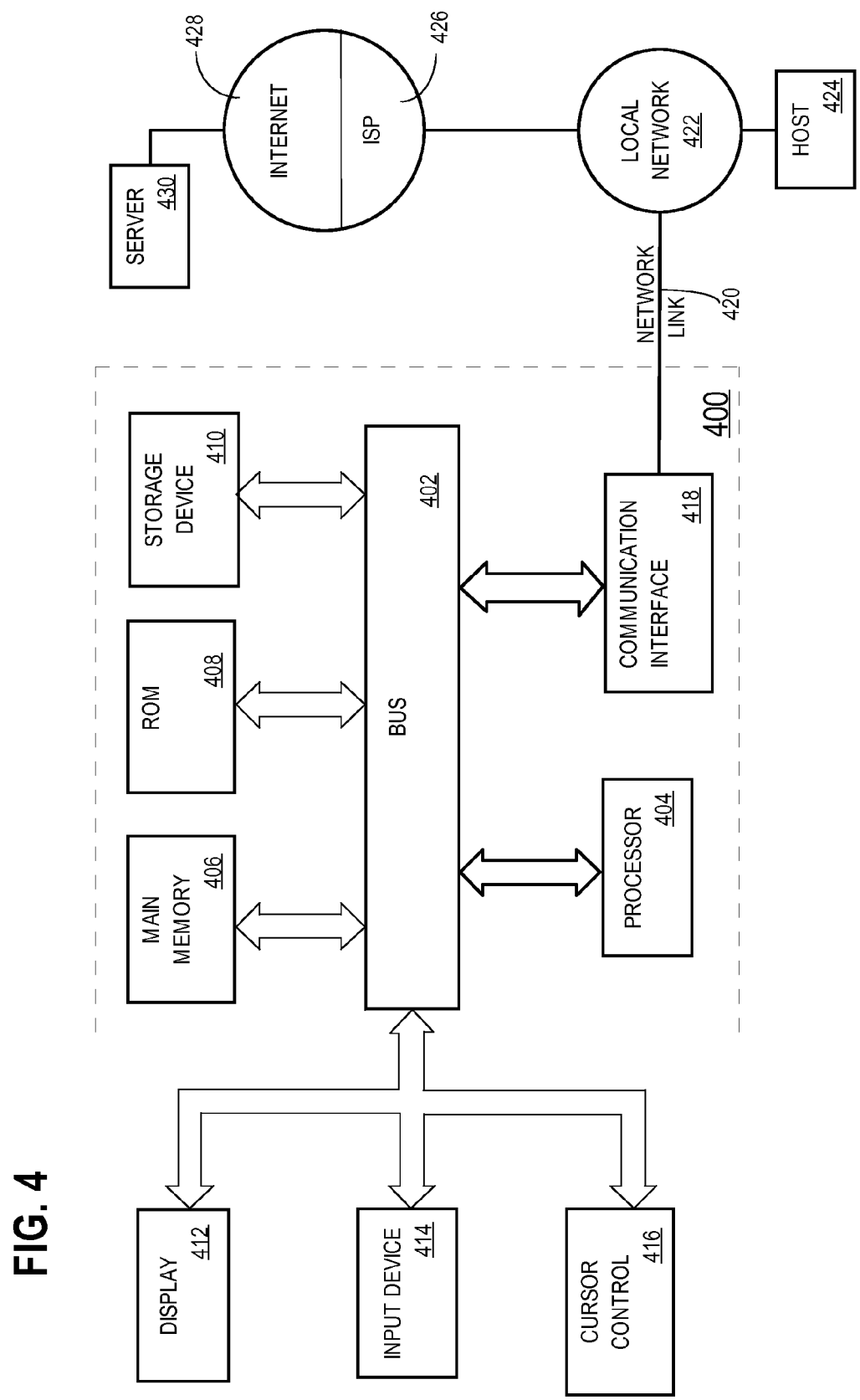
FIG. 4 is a block diagram that illustrates a computer system upon which an embodiment of the invention may be implemented.

A DODC server, Web cache server, load balancing server, load balancing manager, provisioning manager, billing manager, resource manager, image distribution manager, and an origin server may each be implemented on a computer system according to an embodiment of the invention. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for distributing computing resources for application programs across a plurality of servers, comprising:
    partitioning a plurality of servers into a Web server partition and a distributed computing server partition such that each of said partitions has at least one server, each server in the Web server partition configured to serve content to requesting client systems, and each server in the distributed computing server partition capable of being provisioned in real-time to run one or more customer application programs;
    tracking a status of each server in the distributed computing server partition;
    automatically provisioning at least a particular server in the distributed computing server partition to run a customer application program, the particular server already having been provisioned with at least one other application;
    continuing to automatically provision the particular server with customer application programs until the particular server reaches a predetermined level of server usage;
    charging a fee to a customer based on usage of servers in the distributed computing server partition by customer application programs associated with the customer.

2. The method of claim 1, wherein the partitioning step varies the size of the Web server partition and the distributed computing server partition based on demand for each partition of servers.

3. The method of claim 1, wherein the provisioning step provisions the particular server in the distributed computing server partition based on demand for the customer application program.

4. The method of claim 1, further comprising:
    un-provisioning a server in the distributed computing server partition that has been provisioned with the customer application program when demand for the customer application program has fallen below a predetermined level.

5. The method of claim 1, wherein when the customer application program requires a particular operating system, the particular server in the distributed computing server partition is automatically provisioned to run the required operating system.

6. The method of claim 1, wherein the provisioning step includes creating an image of the customer application program and sending the image to the particular server in the distributed computing server partition.

7. The method of claim 6, wherein the provisioning step includes creating an image of the customer application program and a required operating system and sending the image to the particular server in the distributed computing server partition.

8. The method of claim 1, wherein the provisioning step includes selecting the particular server in the distributed computing server partition to be automatically provisioned with the customer application program based on one or more characteristics of the customer application program.

9. The method of claim 1, wherein at least one Web server in the Web server partition comprises a Web cache server.

10. Computer apparatus for distributing computing resources for application programs across a plurality of servers, comprising:
    one or more processors and one or more computer memories holding instructions that, when executed by the one or more processors, cause the computer apparatus to:
    partition a plurality of servers into a Web server partition and a distributed computing server partition such that each of said partitions has at least one server, each server in the Web server partition configured to serve content to requesting client systems, and each server in the distributed computing server partition capable of being provisioned in real-time to run one or more customer application programs;
    track a status of each server in the distributed computing server partition;
    automatically provisions automatically provision a particular server from the distributed computing server partition to run a customer application program, the particular server already having been provisioned with at least one other application;
    continue to automatically provision the particular server with customer application programs until the particular server reaches a predetermined level of server usage;
    calculate a fee for a customer based on usage of servers in the distributed computing server partition provisioned by customer application programs associated with the customer.

11. The computer apparatus of claim 10, wherein the instructions, when executed, cause the computer apparatus to vary the size of the Web server partition and the distributed computing server partition based on demand for each partition of servers.

12. The computer apparatus of claim 10, wherein the instructions, when executed, cause the computer apparatus to automatically provision the particular server in the distributed computing server partition based on demand for the customer application program.

13. The computer apparatus of claim 10, wherein the instructions, when executed, cause the computer apparatus to
    un-provision a server in the distributed computing server partition that has been provisioned with the customer application program when demand for the customer application program has fallen below a predetermined level.

14. The computer apparatus of claim 10, wherein the instructions, when executed, cause the computer apparatus to automatically provision the particular server in the distributed computing server partition to run the required operating system when the customer application program requires a particular operating system.

15. The computer apparatus of claim 10, wherein the instructions, when executed, cause the computer apparatus to create an image of the customer application program and send the image to the particular server in the distributed computing server partition.

16. The computer apparatus of claim 15, wherein the instructions, when executed, cause the computer apparatus to create an image of the customer application program and a required operating system and send the image to the particular server in the distributed computing server partition.

17. The computer apparatus of claim 10, wherein the instructions, when executed, cause the computer apparatus to select the particular server in the distributed computing server partition to be automatically provisioned with the customer application program based on one or more characteristics of the customers application program.

18. A non-transitory computer-readable storage medium carrying one or more sequences of instructions for distributing computing resources for application programs across a plurality of servers, wherein execution of the one or more sequences of instructions by one or more processors causes the one or more processors to perform the steps:
   partitioning a plurality of servers into a Web server partition and a distributed computing server partition such that each of said partitions has at least one server, each server in the Web server partition configured to serve content to requesting client systems, and each server in the distributed computing server partition capable of being provisioned in real-time to run one or more customer application program;
   tracking a status of each server in the distributed computing server partition;
   automatically provisioning a particular server in the distributed computing server partition to run a customer application program, the particular server already having been provisioned with at least one other application;
   continuing to automatically provision the particular server with customer application programs until the particular server reaches a predetermined level of server usage;
   calculating a fee for a customer based on usage of servers in the distributed computing server partition by customer application programs associated with the customer.

19. The non-transitory computer-readable storage medium of claim 18, wherein the partitioning step varies the size of the Web server partition and the distributed computing server partition based on demand for each partition of servers.

20. The non-transitory computer-readable storage medium of claim 18, wherein the provisioning step provisions the particular server in the distributed computing server partition based on demand for the customer application program.

21. The non-transitory computer-readable storage medium of claim 18, further comprising:
   un-provisioning a server in the distributed computing server partition that has been provisioned with the customer application program when demand for the customer application program has fallen below a predetermined level.

22. The non-transitory computer-readable storage medium of claim 18, wherein when the customer application program requires a particular operating system, the particular server in the distributed computing server partition is automatically provisioned to run the required operating system.

23. The non-transitory computer-readable storage medium of claim 18, wherein the provisioning step includes creating an image of the customer application program and sending the image to the particular server in the distributed computing server partition.

24. The non-transitory computer-readable storage medium of claim 23, wherein the provisioning step includes creating an image of the customer application program and a required operating system and sending the image to the particular server in the distributed computing server partition.

25. The non-transitory computer-readable storage medium of claim 18, wherein the provisioning step selects the particular server in the distributed computing server partition to be automatically provisioned with the customer application program based on characteristics of the customer application program.

26. A system for providing distributed computing resources for application programs, comprising:
   a Web server partition having a plurality of Web servers that are configured to serve content to requesting client systems;
   a distributed computing server partition having a plurality of servers that are capable of being provisioned in real-time to run one or more customer application programs;
   a computer system that comprises one or more computers with one or more processors and that tracks a status of each distributed computing server in the distributed computing server partition;
   the computer system automatically provisioning a particular server in the distributed computing server partition to run a customer application program, the particular server already having been provisioned with at least one other application;
   the computer system continuing to automatically provision the particular server with customer application programs until the particular server reaches a predetermined level of server usage; and
   the computer system that calculating a fee to a customer based on usage of servers in the distributed computing server partition by customer application programs associated with the customer.

27. The system of claim 26, wherein the size of the Web server partition relative to the size of the distributed computing server partition is based on relative demand for each partition.

28. The system of claim 26, wherein the computer system automatically provisions the particular server in the distributed computing server partition based on demand for the customer application program.

29. The system of claim 26, wherein the computer system un-provisions a server in the distributed computing server partition that has been provisioned with the customer application program when demand for the customer application program has fallen below a predetermined level.

30. The system of claim 26, wherein the computer system automatically provisions the particular server in the distributed computing server partition to run the required operating system when the customer application program requires a particular operating system.

31. The system of claim 26, wherein the computer system creates an image of the customer application program and sends the image to the particular server in the distributed computing server partition.

32. The system of claim 26, wherein the computer system selects the particular server in the distributed computing server partition to be automatically provisioned with the customer application program based on one or more characteristics of the customer application program.

* * * * *